United States Patent
Benedetti (10) Patent No.: US 9,678,898 B2
(45) Date of Patent: Jun. 13, 2017

(54) CHIP VERIFICATION

(71) Applicant: IRDETO B.V., Hoofddorp (NL)

(72) Inventor: Ettore Benedetti, Hoofddorp (NL)

(73) Assignee: IRDETO B.V., Hoofddorp (NL)

(*) Notice: Subject to any disclaimer, the term of this patent is extended or adjusted under 35 U.S.C. 154(b) by 0 days.

(21) Appl. No.: 14/434,093

(22) PCT Filed: Oct. 11, 2012

(86) PCT No.: PCT/EP2012/004267
§ 371 (c)(1),
(2) Date: Apr. 7, 2015

(87) PCT Pub. No.: WO2014/056515
PCT Pub. Date: Apr. 17, 2014

(65) Prior Publication Data
US 2015/0261692 A1 Sep. 17, 2015

(51) Int. Cl.
*G06F 21/57* (2013.01)
*G06F 12/14* (2006.01)
*G06F 21/79* (2013.01)

(52) U.S. Cl.
CPC ...... *G06F 12/1433* (2013.01); *G06F 12/1408* (2013.01); *G06F 21/57* (2013.01); *G06F 21/79* (2013.01); *G06F 2212/1052* (2013.01)

(58) Field of Classification Search
CPC ........ G06F 21/50; G06F 21/57; G06F 21/572; G06F 21/1433; G06F 12/1433
See application file for complete search history.

(56) References Cited

U.S. PATENT DOCUMENTS

| 7,984,304 B1* | 7/2011 | Waldspurger ......... G06F 21/565 |
| | | 713/187 |
| 2003/0021413 A1* | 1/2003 | Kiiveri .................. H04W 88/02 |
| | | 380/247 |

(Continued)

FOREIGN PATENT DOCUMENTS

| EP | 1050789 A2 | 11/2000 |
| EP | 2506176 A1 | 10/2012 |
| WO | 2006116871 A2 | 11/2006 |

OTHER PUBLICATIONS

International Search Report and Written Opinion cited in corresponding International Application No. PCT/EP2012/004267 dated Feb. 13, 2013.

(Continued)

*Primary Examiner* — David Pearson
(74) *Attorney, Agent, or Firm* — Rimon, P.C.; Marc S. Kaufman (57) ABSTRACT

There is described a chip comprising a one-time programmable (OTP) memory programmable to store chip configuration data, and a verification module operable to access the OTP memory. The verification module is operable to receive a verification request relating to a specified portion of the OTP memory, the verification request comprising mask data defining the specified portion of the OTP memory. In response to the verification request, the verification module is operable to use the mask data and the OTP memory to generate verification data relating to the specified portion of the OTP memory, the verification data further being generated based on a secret key of the chip.

There is also described a chip-implemented method of generating verification data relating to a specified portion of a one-time programmable (OTP) memory of the chip. There are also described methods for primary or secondary veri- (Continued)

fication systems to verify a configuration of a specified portion of the OTP memory the above mentioned-chip.

15 Claims, 6 Drawing Sheets

(56) References Cited

U.S. PATENT DOCUMENTS

| | | | | |
|---|---|---|---|---|
| 2006/0265733 | A1* | 11/2006 | Chen | G06F 21/71 |
| | | | | 726/1 |
| 2007/0156638 | A1* | 7/2007 | Vadekar | G06F 21/57 |
| 2007/0157000 | A1* | 7/2007 | Qawami | G11C 16/22 |
| | | | | 711/170 |
| 2007/0188351 | A1* | 8/2007 | Brown | G01R 31/3172 |
| | | | | 340/999 |
| 2007/0290715 | A1* | 12/2007 | Baer | G06F 21/71 |
| | | | | 326/38 |
| 2008/0034444 | A1* | 2/2008 | Sears | A63F 13/12 |
| | | | | 726/29 |
| 2009/0222910 | A1* | 9/2009 | Le Bihan | G06F 21/445 |
| | | | | 726/19 |
| 2014/0122897 | A1* | 5/2014 | Dodeja | G06F 21/00 |
| | | | | 713/189 |

OTHER PUBLICATIONS

Menezes, et al. "Hash Functions and Data Integrity", Handbook of Applied Cryptography; CRC Press Series on Discrete Mathematics and its Applications, CRC Press, Boca Raton, FL, US, Jan. 1, 1997, pp. 321-383, XP002275660, ISBN: 978-0-8493-8523-0.

* cited by examiner

CHIP VERIFICATION

The present application is the United States national stage of International Application No. PCT/EP2012/004267, filed Oct. 11, 2012, the entire content of which is incorporated herein by reference.

FIELD OF THE INVENTION

The present invention relates to chip verification. In particular, the present invention relates to a chip and associated methods for verifying a configuration of the chip.

BACKGROUND OF THE INVENTION

Advances in chip technology lead to smaller feature sizes. This makes it economically attractive to create chips that include a number of functional modules that can be selectively enabled or disabled on a chip to support the subset of features required for a particular appliance or electronic device in which the chip is to be included. Such a chip is also known as a System on a Chip (SoC). This selective enablement of the functional modules is controlled by One Time Programmable (OTP) memory.

The selection mechanism programs the appropriate values in the OTP memory which enables or disables a functional module on the chip. Examples are proprietary circuits for specific customers, optional functions and/or licensed IP cores. This mechanism makes it possible for the chip manufacturer to manufacture a single chip that can be configured for use in a wide range of appliances.

During the chip manufacturing process, logic circuits are defined by the chip design topology which is expressed in a sequence of production masks that are used to manufacture the chip. The logic circuits include the functional modules that are initialised at a later production step. The chip manufacturing also involves testing of the circuit, (optionally) programming chip unique data in the OTP, and packaging the chip. The sequence of these steps and the number of testing stages can differ between chip manufacturers.

Figure 1:
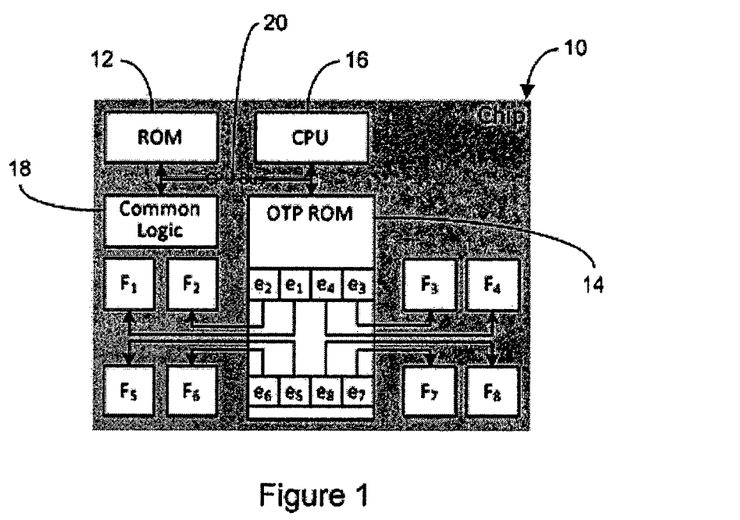
FIG. 1 schematically illustrates a prior art chip.

A block diagram of an exemplary prior art chip 10 is shown in FIG. 1. The chip 10 comprises a Read Only Memory (ROM) 12, an OTP memory 14, a Central Processing Unit (CPU) 16 and common logic modules 18, all of which are connected together by means of a CPU bus 20. The chip further comprises several configurable functional modules $F_1 \ldots F_8$. The OTP memory 14 includes memory locations $e_1 \ldots e_8$ that control the enablement/activation (or alternatively the disablement/deactivation) of the functional modules $F_1 \ldots F_8$ respectively. These OTP memory locations $e_1 \ldots e_8$ can each be written only once with a particular value (active/not active, "0"/"1") depending on whether it is desired to enable or disable the corresponding functional module $F_1 \ldots F_8$. In general the memory locations $e_1 \ldots e_8$ for the functional modules $F_1 \ldots F_8$ are left unprogrammed (i.e. unwritten) during the chip manufacturing process, although some other values of the OTP memory 14 may be programmed during this process. This programming step typically involves the loading of secret keys and/or similar confidential information onto the chip 10.

As part of the manufacture of an appliance including such a chip 10, the (packaged) chip 10 is placed on a circuit board that provides the electrical interfaces between the various components that are needed for the particular appliance. During the manufacturing process, the OTP memory 14 can be further programmed to personalise (or configure) the chip 10 in accordance with the requirements of the particular appliance. These additional OTP programming steps involve writing active/not active data values to the memory locations $e_1 \ldots e_8$ of the OTP memory 14. These data values customise the chip 10 for a particular use. This may include disabling certain functions $F_1 \ldots F_8$ in the chip 10 such that only an intended set of circuits (i.e. functional modules $F_1 \ldots F_8$) is left active on the chip 10. Some of the personalisation functions may cause complications during testing of the appliance manufacturing (e.g. secure bootstrap, restrict access to certain memory locations or peripherals). Hence, such functional modules are activated in incremental steps during the manufacturing process.

During the manufacturing process of an appliance, errors can occur in the configuration of the chip 10. Errors in the manufacturing process that involve an incorrect programming of the OTP memory 14 can result in a chip 14 that does not have the appropriate functional modules enabled/disabled. Errors resulting in a reduced functional behaviour are generally caught during the testing procedures which form part of the manufacturing process. However, incorrect programming of the OTP memory 14 may also result in undesired functional modules $F_1 \ldots F_8$ being enabled by mistake during the manufacturing process. This may lead to (hidden) additional functionality in the appliance, which is not always able to be detected during the functional testing procedures that form part of the manufacturing process.

Some chips are equipped with a range of security functionalities, e.g. the ability to securely process data even if the chip 10 includes a general purpose processor running potentially rogue or breached software, or the ability to restrict the boot code to that of a single software vendor only. In order to achieve such goals, the chip 10 is often personalized with some kind of key material. Such key material may be managed by a Trusted Third Party (UP) responsible for the overall security of the chip 10 (under the assumption that SoC security design is sound).

Such security functionalities are typically (permanently) enabled as soon as possible in the process. However, the chip 10 may undergo several production steps, possibly in different locations, all with decreasing trust levels. At each step, only a fraction (not all) of the security measures may be enabled. Thus, at each of the production steps the OTP memory 14 can be further tightened to obtain a higher security level during the following production step. Each of the OTP programming steps may actually be skipped.

The potential for undesired hidden functionality on the chip 10 may result in problems during the deployment of the appliance, and may also impact on parties that derive revenues from the actual use of their IP cores on the chip 10. In order to mitigate this problem, the appliance manufacturer often provides a readout of the OTP memory 14 to the licensing partners and other interested parties. However, since the OTP memory 14 in each type of appliance should have the same memory values for the personalisation of the functional modules $F_1 \ldots F_8$, there is no real need for the appliance manufacturer to actually provide the observed values from each chip 10. Under pressure, the readout of the OTP memory 14 can be forged by the manufacturer, causing the hidden functionality to remain undetected in the shipped appliances.

Most authentication methods involve the calculation of a code involving a segment of data. As some of the values in the OTP memory 14 may comprise confidential information, it is not possible to use this information in an authentication code.

Hence there is a need for a technology that enables an appliance manufacturer to demonstrate to the various stakeholders that the chip personalisation configuration in each shipped appliance meets the requirements of these stakeholders. The present invention seeks to provide such a technology and associated methods.

SUMMARY OF THE INVENTION

It follows from the discussion above that a chip configuration cannot currently be established reliably by a third party. The present invention provides a chip and associated methods to enable third parties to reliably establish the chip configuration.

According to a first aspect of the present invention, there is provided a chip comprising a one-time programmable (OTP) memory programmable to store chip configuration data, and a verification module operable to access the OTP memory. The verification module is operable to receive a verification request relating to a specified portion of the OTP memory, the verification request comprising mask data defining the specified portion of the OTP memory. In response to the verification request, the verification module is operable to use the mask data and the OTP memory to generate verification data relating to the specified portion of the OTP memory, the verification data further being generated based on a secret key of the chip.

According to a second aspect of the present invention, there is provided a chip-implemented method of generating verification data relating to a specified portion of a one-time programmable (OTP) memory of the chip. The OTP memory is programmable to store chip configuration data. The method comprises: (a) receiving a verification request relating to the specified portion of the OTP memory, wherein the verification request comprises mask data defining the specified portion of the OTP memory; and (b) in response to the verification request, using the mask data and the OTP memory to generate verification data relating to the specified portion of the OTP memory, wherein the verification data is further generated based on a secret key of the chip.

Cryptography is a well established technology area that uses mathematical operations to process digital information and streams. For this invention use is made of well known cryptographic primitives such as a Message Authentication Code (MAC) (i.e. a keyed/cryptographic hash value) and/or a digital signature that can be used to create certificates. Certificates are used in various fields to demonstrate that a message is from a legitimate source.

The invention uses a (secured) verification module on the chip that has access to the chip configuration data in the OTP memory and that uses confidential chip information (i.e. the secret key) to generate a unique (personalised) message that enables a stakeholder to verify that the chip is appropriately configured for a particular appliance. The confidential chip information is unique to the individual chip, and is "confidential" in the sense that it cannot easily be read from the chip. The confidential chip information may be stored within the (secured) verification module. The verification module checks only certain memory values of the OTP memory relating to a subset of the chip configuration data. Mask data (e.g. a bit mask) is used to select the bit values of the OTP memory segment that is being authenticated by the verification module.

Advantageously, the chip further comprises a plurality of functional modules, wherein the chip configuration data is operable to selectively enable or disable each of the plurality of functional modules.

In one embodiment, the OTP memory comprises a bit array (B) and the mask data comprises a bit mask (M) defining a specified portion of the bit array.

Optionally, the verification request further comprises a nonce, and the verification data is further generated based on the nonce.

In one embodiment, the verification module is operable to generate the verification data using a keyed cryptographic hash function.

The secret key may be a symmetric key or an asymmetric key. In one embodiment, the secret key is a private key of the chip. This embodiment relates to asymmetric cryptography. In another embodiment, the secret key is a symmetric secret key shared by the chip and a primary verification system. This embodiment relates to symmetric cryptography. Optionally, the verification request further comprises ID data associated with a party submitting the verification request to the chip, and the verification data is further generated based on the ID data.

According to a third aspect of the present invention, there is provided a method for a primary verification system to verify a configuration of a specified portion of the OTP memory of the chip of the first aspect above. An expected configuration of the specified portion of the OTP memory of the chip is known to the primary verification system. A verification key associated with the secret key of the chip is also known to the primary verification system. The method comprises: (a) sending to the chip a verification request relating to the specified portion of the OTP memory, wherein the verification request comprises mask data defining the specified portion of the OTP memory; (b) receiving from the chip verification data relating to the specified portion of the OTP memory, wherein the verification data is generated by the chip based on the OTP memory, the received mask data and the secret key; and (c) verifying the received verification data using the expected configuration of the chip, the mask data and the verification key so as to determine whether the configuration of the specified portion of the OTP memory of the chip is as expected.

This third aspect of the invention allows the chip verification module to be used by a third party (i.e. the primary verification system) that knows a verification key corresponding to the confidential secret key used by the chip verification module. The primary verification system may be a Trusted Third Party (UP).

The secret key may be a symmetric key or an asymmetric key. In one embodiment, the secret key is a private key of the chip and the verification key is a public key of the chip. This embodiment relates to asymmetric cryptography. In another embodiment, the verification key is the same as the secret key. In other words, the secret key is a symmetric secret key shared by the chip and the primary verification system. This embodiment relates to symmetric cryptography.

According to a fourth aspect of the present invention, there is provided a method for a secondary verification system to verify a configuration a specified portion of the OTP memory of the chip of the first aspect above when the secret key is a symmetric secret key shared by the chip and a primary verification system. An expected configuration of the specified portion of the OTP memory of the chip is known to the secondary verification system. The method comprises: (a) receiving from the primary verification system mask data defining a specified portion of the OTP memory; (b) receiving from the primary verification system ID data associated with the secondary verification system; (c) receiving from the primary verification system a secondary key, wherein the secondary key is derived by the primary verification system from the ID data and the secret key using a key derivation scheme; (d) sending to the chip a verification request relating to the specified portion of the OTP memory, wherein the verification request comprises the mask data and the ID data; (e) receiving from the chip verification data relating to the specified portion of the OTP memory, wherein the verification data is generated by the chip based on the OTP memory, the received mask data and the secondary key, wherein the secondary key is derived by the chip from the received ID data and the secret key using the key derivation scheme; and (f) verifying the received verification data using the expected configuration of the chip, the mask data and the secondary key so as to determine whether the configuration of the specified portion of the OTP memory of the chip is as expected.

This fourth aspect of the invention allows the chip verification module to be interrogated by a third party (i.e. the secondary verification system) that does not itself have access to the secrets used by the verification module. In particular, the secondary verification system does not know or have access to the secret key that is shared between the chip and the primary verification system. Thus, the primary verification system issues the secondary verification system with its own unique secondary key based on the secret key. The chip is able to independently calculate the secondary key.

According to a fifth aspect of the present invention, there is provided a computer program which, when executed by a processor, causes the processor to carry out the method of the third or fourth aspects above.

According to a sixth aspect of the present invention, there is provided a data carrying medium carrying the computer program of the fifth aspect above.

The data carrying medium may be a storage medium or a transmission medium.

According to a seventh aspect of the present invention, there is provided a set top box comprising the chip of the first aspect.

Other preferred features of the present invention are set out in the appended claims.

BRIEF DESCRIPTION OF THE DRAWINGS

Embodiments of the present invention will now be described by way of example with reference to the accompanying drawings in which:

FIGS. 5a and 5b schematically depict a verification procedure in one exemplary embodiment.

FIGS. 7a, 7b and 7c schematically depict a verification procedure in one exemplary embodiment.

DETAILED DESCRIPTION OF A PREFERRED EMBODIMENT

Figure 2:
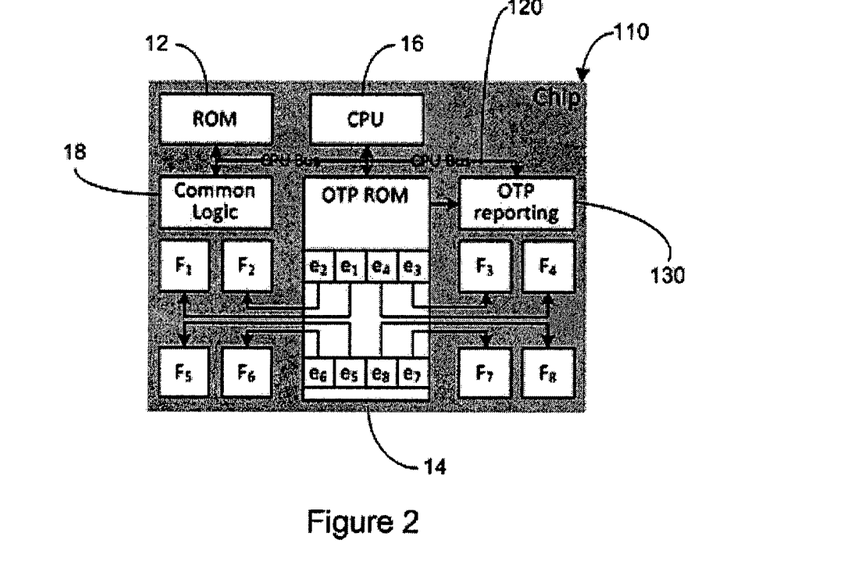
FIG. 2 schematically illustrates a chip according to one embodiment of the present invention.

A chip (or SoC) 110 according to one embodiment of the invention is shown in FIG. 2. The chip 110 is broadly similar to the prior art chip 10 shown in FIG. 1 except for the differences described below.

The chip 110 of FIG. 2 further includes a verification module (or OTP reporting module) 130. The CPU bus 120 of the chip 110 additionally connects the verification module 130 to the ROM 12, the OTP memory 14, the CPU 16 and the common logic modules 18. Thus, the verification module 130 can access the OTP memory 14. The verification module 130 may also be connected to the CPU 16 of the chip 110 (if present). The verification module 130 may also be configured with a communication interface (not shown) to external equipment without the involvement of the main CPU 16 of the chip 110.

The OTP memory 14 stores chip configuration data. For example, referring to the functional modules $F_1 \ldots F_8$ in the chip 110, the chip configuration data is operable to selectively enable or disable each of the functional modules $F_1 \ldots F_8$. In this case, the chip configuration data is stored in OTP memory locations $e_1 \ldots e_8$. Other chip configuration data may also be stored in the OTP memory 14.

During the chip manufacturing process, the chip 110 is configured with a small amount of data that is only known to a particular third party. This particular third party is referred to as a "primary verification system" or a "Trusted Third Party" (TTP) below. Advantageously, the verification module 130 of the chip 110 is configured with this data. This data is intended for use as a secret key K in cryptographic operations. The secret key K may be secured so that it cannot be observed or modified without significant effort. The key K should not be accessible for generic software programs during execution on the chip 110 or through the external interfaces (pins).

An Overview of the General Verification Procedure

At the end of a chip manufacturing cycle, the primary verification system can request the chip 110 to generate a verification message relating to the configuration data in the OTP memory 14. For a particular type of chip 110, the configuration data would be expected to be the same for each chip 110. Since the third party wants to be certain that the verification message is generated by the verification module 130 of a particular chip 110 (rather than by the manufacturer, say), the generated verification message needs to be different for different chips 10. Therefore, the verification module 130 uses the key K of the chip 110 to generate the verification message. For example, the verification module 130 may use the key K to generate a cryptographic hash value for particular memory locations $e_1 \ldots e_8$ of the OTP memory 14 and output the result. There are a wide range of functions that can be used to calculate a cryptographic hash value. In a variant, the key K may be used to digitally sign or encrypt some or all of the configuration data stored in the OTP memory 14.

Only the primary verification system (that has knowledge of the expected configuration data in the OTP memory 14 and of the key K (or a key associated with the key K—e.g. public vs. private keys) can verify that the generated hash value matches the expected configuration data. A mismatch in the hash values is an indication of a manufacturing problem.

In order to prevent generation of identical hash values for chips 10 of the same type, the key K is unique to a particular chip 110. Alternatively, a common (symmetric) key K may be used, and some random data (e.g. a nonce) may be combined with data from the OTP memory 14 to form an input to the cryptographic hash function. The nonce may form part of the verification request from the primary verification system to the chip 110. Alternatively, if the chip 110 has an adequate random number generator, the nonce may be generated within the chip 110. In this case, the random data also is also part of the generated verification message such that the primary verification system can validate the generated hash value. As will be understood, properties of the hash function make it computationally infeasible to determine the key K from knowledge of only the expected configuration data and the random data.

In some cases, the primary verification system is interested in a specific subset of the configuration data in the OTP memory 14. Therefore, the verification request from the primary verification system to the chip 110 includes mask data indicating a specified portion of the OTP memory 14. This is advantageous since including other data values from the OTP memory 14 can create problems if these values are under the control of other parties, making it difficult to establish the expected hash value.

An Overview of the Chip-Implemented Verification Procedure

Figure 3:
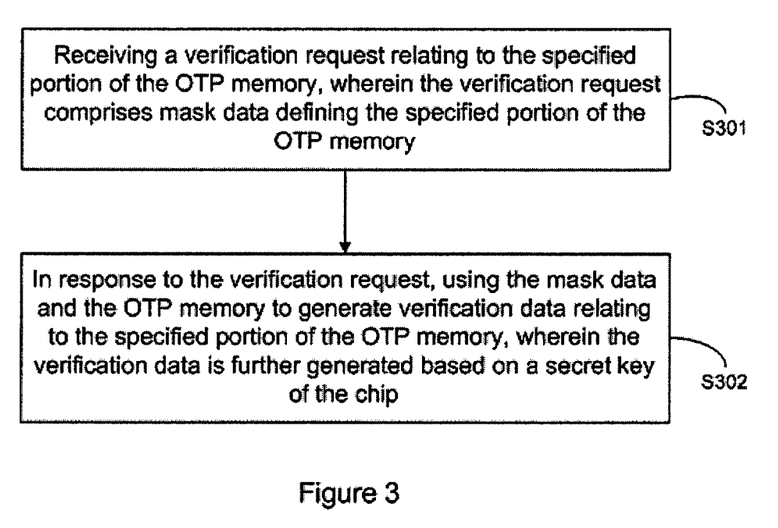
FIG. 3 is a flow chart showing the high level steps in a chip-implemented method of generating verification data relating to a specified portion of the OTP memory of the chip of FIG. 2.

FIG. 3 is a flow chart showing the high level steps in a chip-implemented method of generating verification data relating to a specified portion of the OTP memory 14 of the chip 110. The specified portion of the OTP memory 14 may relate to specific memory locations $e_1 \ldots e_8$ of the OTP memory 14 corresponding to particular functional modules $F_1 \ldots F_8$ that are of interest to a requesting party.

At step S301, the chip 110 receives a verification request from the requesting party (e.g. the primary verification system) relating to the specified portion of the OTP memory 14. The verification request comprises mask data defining the specified portion of the OTP memory 14. The mask data may be a bit mask, for example. Alternatively, the mask data may comprise addresses of relevant memory locations $e_1 \ldots e_8$ in the OTP memory 14.

The verification request is handled by the verification module 130 of the chip 110. At step S302, in response to the verification request, the verification module 130 of the chip 110 uses the mask data and the OTP memory 14 to generate verification data relating to the specified portion of the OTP memory. The verification data is further generated based on the secret key K of the chip 110.

Thus, the verification module 130 is able to generate a verification message (i.e. the verification data) to enable the requesting party to verify that the personalisation configuration of the functional modules $F_1 \ldots F_8$ in the chip 110 meets certain requirements. Use of the mask data ensures that only those functional modules $F_1 \ldots F_8$ of interest to the requesting party are considered in the verification process.

An Overview of Verification by the Primary Verification System

Figure 4:
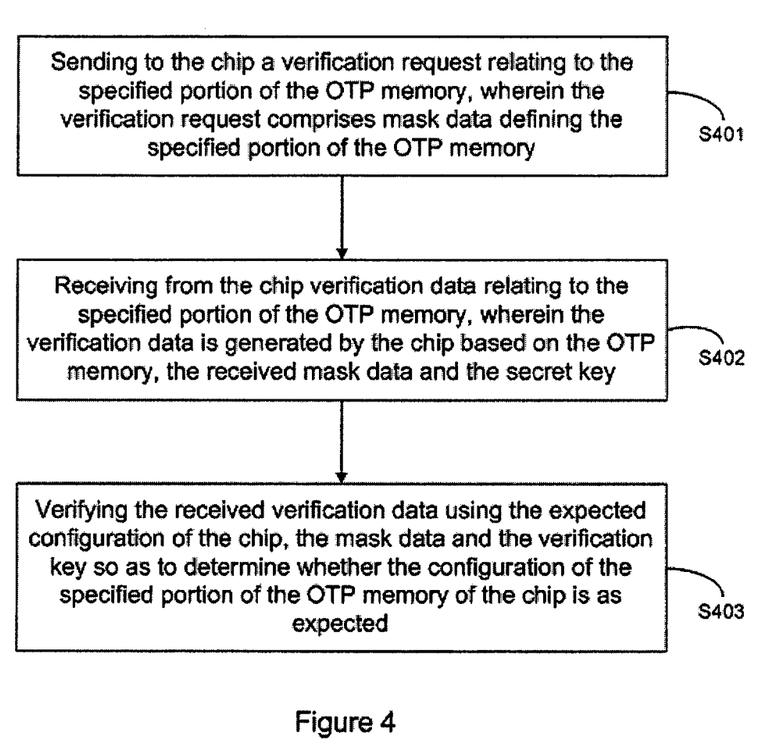
FIG. 4 is a flow chart showing the high level steps in a method for a primary verification system to verify a configuration of a specified portion of the OTP memory of the chip of FIG. 2.

FIG. 4 is a flow chart showing the high level steps in a method for the primary verification system to verify a configuration of a specified portion of the OTP memory 14 of the chip 110 described above. As mentioned above, the primary verification system knows an expected configuration of the specified portion of the OTP memory 14 of the chip 110. Furthermore, the primary verification system also knows a verification key associated with the secret key K of the chip 110. For example, the verification key could be identical to the secret key K of the chip in a symmetric cryptography embodiment. However, it will be appreciated that asymmetric cryptography could alternatively be used.

At step S401, the primary verification system sends to the chip 110 a verification request relating to the specified portion of the OTP memory 14. The verification request comprises mask data defining the specified portion of the OTP memory 14.

The verification request is handled by the verification module 130 of the chip 110 as described above with respect to step S302 in FIG. 3. So, in response to the verification request, the verification module 130 of the chip 110 uses the mask data and the OTP memory 14 to generate verification data relating to the specified portion of the OTP memory. The verification data is further generated based on the secret key of the chip 110. At step S402, the primary verification system receives from the chip 110 the verification data generated the chip 110.

At step S403, the primary verification system verifies the received verification data using the expected configuration of the chip, the mask data and the verification key (e.g. which is identical to or related to the secret key K) so as to determine whether the configuration of the specified portion of the OTP memory of the chip 110 is as expected.

If the verification in step S403 is not as expected, this is indicative of a manufacturing problem.

A Detailed Example of Verification by the Primary Verification System

In this detailed example, symmetric cryptography is used, but it will be appreciated that asymmetric cryptography (using public and private keys of the chip and the primary verification system) could alternatively be used.

In this example, the OTP memory 14 is modelled as a S-bit array $B=\{B_0, B_1, B_2, \ldots, B_{S-1}\}$ and the primary verification system is interested in establishing the authenticity of N bits at position F in the S-bit array B, where $F=\{F_0, F_1, F_2, \ldots, F_{N-1}\}$ and where $N \leq S$. The verification message received from the chip 110 should therefore only depend on said N bits, and be independent of any other bit. In other words, the verification message should be a function only of the N bits $B_{F_0}, B_{F_1}, B_{F_2}, \ldots, B_{F_{N-1}}$. Therefore, consider mask data in the form of a bit mask M where $M_j=0$ if $j \notin F$ and $M_j=1$ if $j \in F$.

Figure 5A:
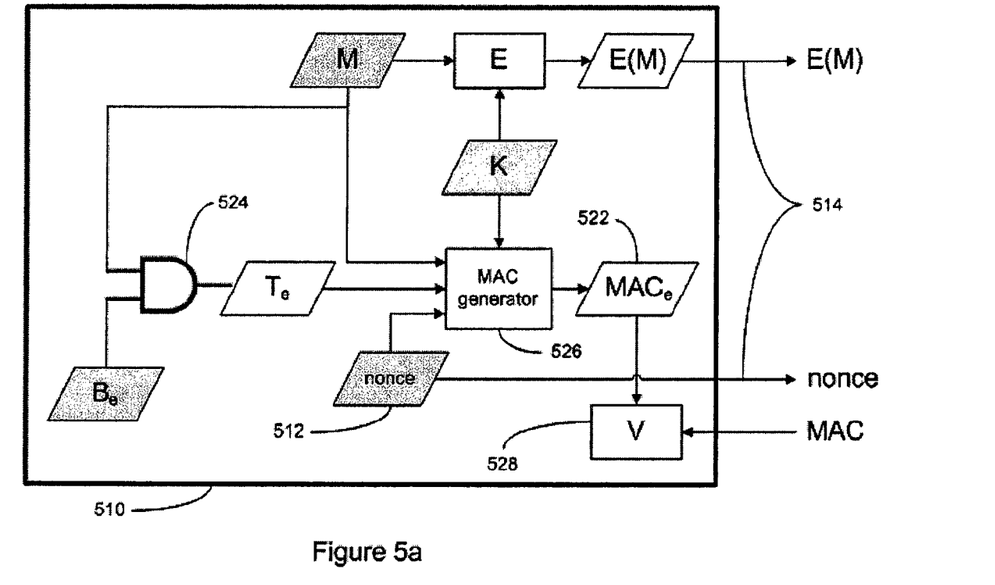
FIG. 5a schematically depicts data and processes of a primary verification system, and FIG. 5b schematically depicts data and processes of the chip of FIG. 2.
Figure 5B:
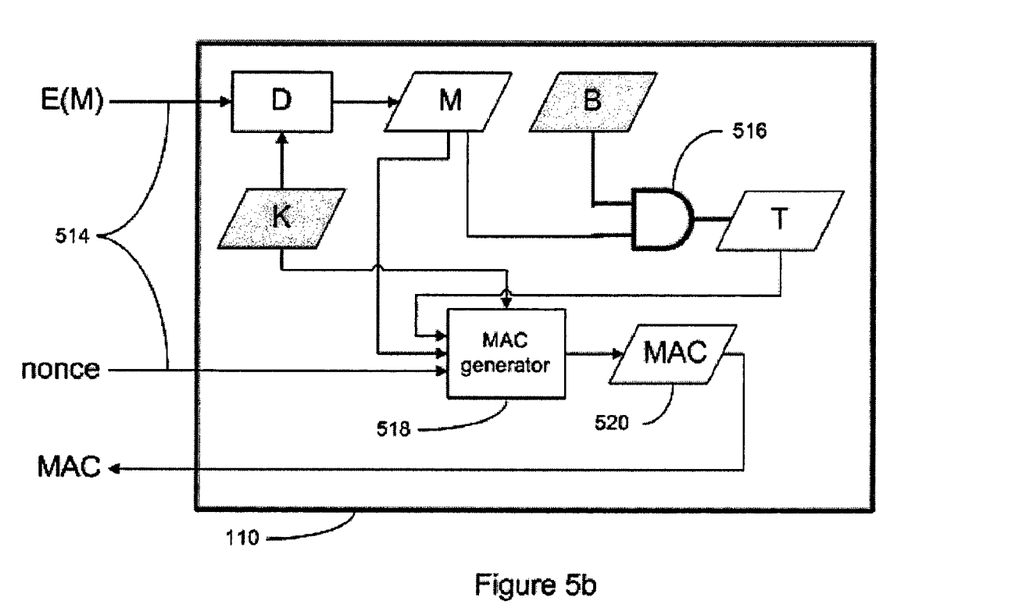

FIGS. 5a and 5b schematically depict a verification procedure in one exemplary embodiment. FIG. 5a schematically depicts data and processes of the primary verification system 510, and FIG. 5b schematically depicts data and processes of the chip 110. Data is shown in parallelogram-shaped objects and processes are shown in rectangular objects.

As described above, the chip 110 has stored thereon the symmetric secret key K, and the bit array B containing configuration data. This stored data is shown by means of shaded parallelogram-shaped objects in FIG. 5b.

The primary verification system 510 has access to the symmetric secret key K of the chip 110, the bit mask M, a random value or nonce 512, and the expected values of B, namely $B_e$. These values may be stored in one or more memories of the primary verification system 512, or may be accessible to the primary verification system by some other means. This known data is shown by means of shaded parallelogram-shaped objects in FIG. 5a.

Using an encryption module E, the primary verification system 510 encrypts the bit mask M using the symmetric secret key K to provide an encrypted bit mask E(M). Referring to step S401, the primary verification system 510 sends a verification request 514 to the chip 110. The verification request 514 includes the encrypted bit mask E(M) and the nonce 512. The verification request 514 may be submitted directly or indirectly via a secure or unsecure channel.

Referring to step S301, the verification request 514 is then received by the chip 110. Using a decryption module D, the chip 110 internally decrypts the received encrypted bit mask E(M) using the symmetric secret key K. Thus, the chip 110 gains knowledge of the bit mask M. The chip 110 then internally computes a bit array T, where $T = B \wedge M$. This computation is schematically depicted by the AND gate 516 in FIG. 5b. This computation acts to set $T_j = 0$ if $j \notin F$, and to set $T_j = 1$ if $j \in F$. Thus, all irrelevant bits of B are disregarded.

Referring to step S302, the chip 110 then generates verification data. In this embodiment, a Message Authentication Code (MAC) is the mechanism for establishing authenticity. However, it will be appreciated that other mechanisms could alternatively be used. As shown in FIG. 5b, the bit mask M, the bit array T, and the received nonce 512 are all input into a MAC generator 518 of the chip 110 which is keyed with the symmetric secret key K. The MAC generator 518 outputs a MAC value 520, where MAC=MAC (nonce∥M∥T). In other words the MAC value 520 is a keyed hash of the nonce 512 concatenated with the bit mask M and the bit array T. The MAC value 520 is then sent to the primary verification system 510. Thus, in this embodiment, the verification data is the MAC value 520.

The primary verification system 510 independently calculates an expected MAC value (MAC$_e$) 522. In particular, the primary verification system 510 computes a bit array $T_e$, where $T_e = B_e \wedge M$. This computation is schematically depicted by the AND gate 524 in FIG. 5a. The computation is actually a filter operation with $B_e$ containing the memory addresses that need to be used as input to the MAC calculation. Thus, all irrelevant bits of $B_e$ are disregarded. As shown in FIG. 5a, the bit mask M, the bit array $T_e$, and the nonce 512 are all input into a MAC generator 526 of the primary verification system 510 which is keyed with the symmetric secret key K. The MAC generator 526 outputs MAC$_e$ 522, where MAC$_e$=MAC (nonce∥M∥$T_e$). In other words, the expected MAC value (MAC$_e$) 522 is a keyed hash of the nonce concatenated with the bit mask M and the bit array $T_e$.

Having received the MAC value 520 in step S402, and having calculated the expected MAC value (MAC$_e$) 522, the primary verification system 510 is able to compare the received and expected MAC values (MAC 520 and MAC$_e$ 522) using a verification module 528. This forms part of step S403. If the MAC 520 and MAC$_e$ 522 values match, then the configuration data in the OTP memory 14 of the chip 110 is as expected for the bits of interest (i.e. the N bits at position F in the S-bit array B). If the MAC 520 and MAC$_e$ 522 values do not match, this is indicative of a manufacturing problem for the chip 110. An output of the verification module 528 may be provided to a user.

Thus, it is possible to detect misconfigurations and any tampering with the results. The scheme described above allows the primary verification system 510 to confirm that the SoC is configured as expected in the pertinent areas of the OTP memory 14, even if the data was collected in an unsecure environment. Also, the scheme allows the primary verification system 510 to alter the bit mask M so as to provide verification for different areas of the OTP memory 14, even long after the chip 110 has been produced.

An Overview of Verification by a Secondary Verification System

Figure 6:
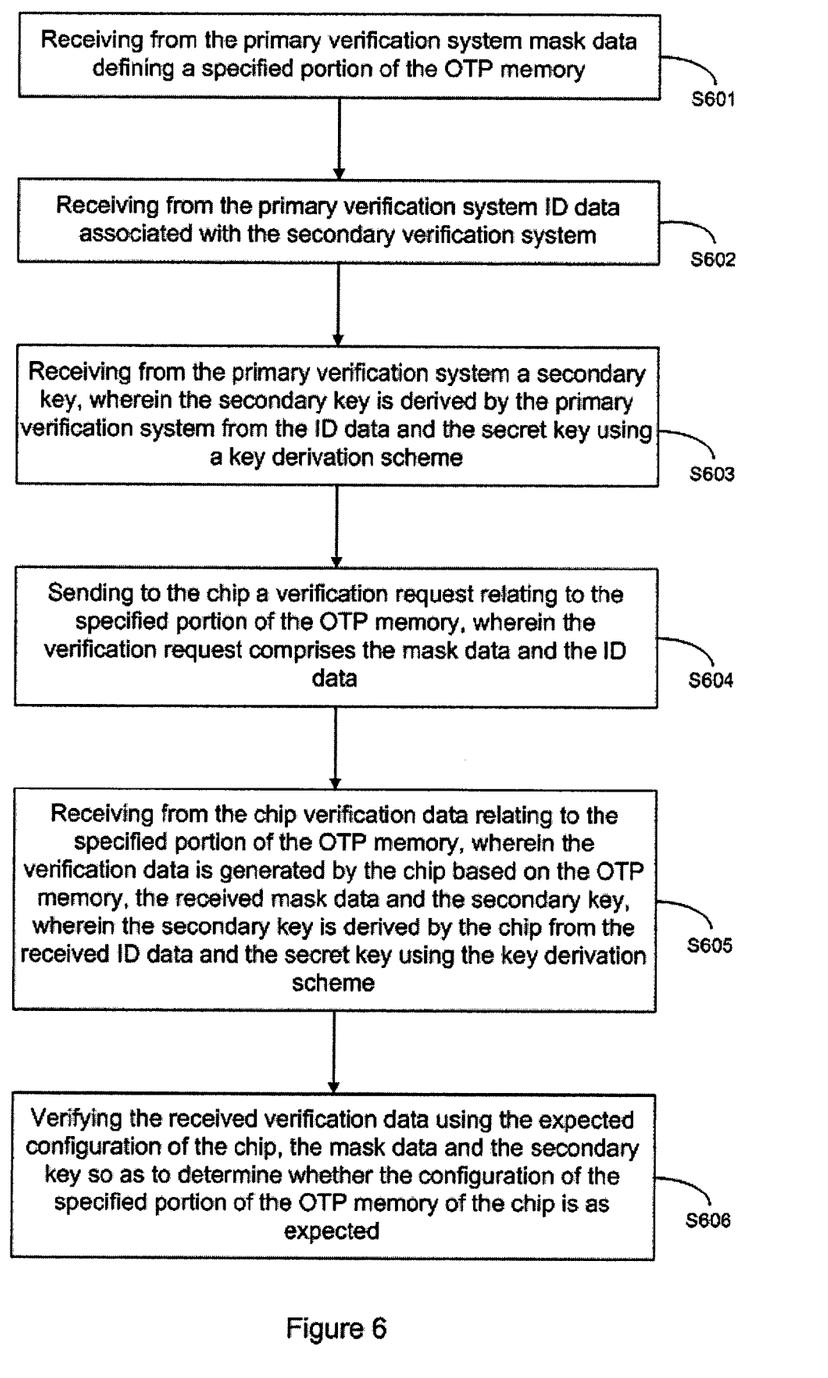
FIG. 6 is a flow chart showing the high level steps in a method for a secondary verification system to verify a configuration of a specified portion of the OTP memory of the chip of FIG. 2.

FIG. 6 is a flow chart showing the high level steps in a method for a secondary verification system to verify a configuration of a specified portion of the OTP memory 14 of the chip 110 described above. In this method, the secret key K is a symmetric secret key such that symmetric cryptography is used. Like the primary verification system, the secondary verification system knows an expected configuration of the specified portion of the OTP memory 14 of the chip 110. However, the secondary verification system does not know the symmetric secret key K of the chip 110. Thus, in order to perform verification in the absence of the symmetric secret key K, the secondary verification system must receive related key information from the primary verification system 510 which knows the symmetric secret key K. The secondary verification system may be any third party interested in the configuration of a specified portion of the OTP memory 14 of the chip 110. For example, the secondary verification system may be an IP right holder in relation to one of the functional modules $F_1 \ldots F_8$ of the chip 110.

At step S601, the secondary verification system receives from the primary verification system 510 mask data defining a specified portion of the OTP memory 14. At step S602, the secondary verification system receives from the primary verification system 510 ID data associated with the secondary verification system. At step S603, the secondary verification system receives from the primary verification system 510 a secondary key. The secondary key is derived by the primary verification system from the ID data and the symmetric secret key K using a key derivation scheme. It will be appreciated that steps S601-603 could be performed in a different order, or all at once, for example.

At step S604, the secondary verification system sends to the chip 110 a verification request relating to the specified portion of the OTP memory 14. The verification request comprises the mask data and the ID data.

The verification request is handled by the verification module 130 of the chip 110 in a similar way to that described above with respect to step S302 in FIG. 3. So, in response to the verification request, the verification module 130 of the chip 110 uses the mask data and the OTP memory 14 to generate verification data relating to the specified portion of the OTP memory. The verification data is further generated based on the secondary key that can be derived by the chip 110 from the received ID data and the symmetric secret key K using the same key derivation scheme as was used by the primary verification system 510. At step S605, the secondary verification system receives from the chip 110 the verification data generated the chip 110.

At step S606, the secondary verification system verifies the received verification data using the expected configuration of the chip, the mask data and the secondary key so as to determine whether the configuration of the specified portion of the OTP memory of the chip is as expected.

If the verification in step S606 is not as expected, this is indicative of a manufacturing problem.

A Detailed Example of Verification by the Secondary Verification System

In this example, assume that there are a number of separate secondary verification systems, all of which are interested in verifying different (but potentially overlapping) portions of the configuration data in the OTP memory 14 of the chip 110. Thus, a secondary verification system designated i may be interested in a portion $F_i$ of the configuration data. In other words, the secondary verification system is interested in establishing the authenticity of $N_i$ bits at position $F_i$ in the S-bit array B, where $B=\{B_0, B_1, B_2, \ldots, B_{S-1}\}$, where $F_i=\{F_{i_0}, F_{i_1}, F_{i_2}, \ldots, F_{i_{N-1}}\}$, and where $N_i \leq S$. Since $F_i$ is different for each secondary verification system, a different bit mask $M_i$ must be provided to each secondary verification system.

Figure 7A:
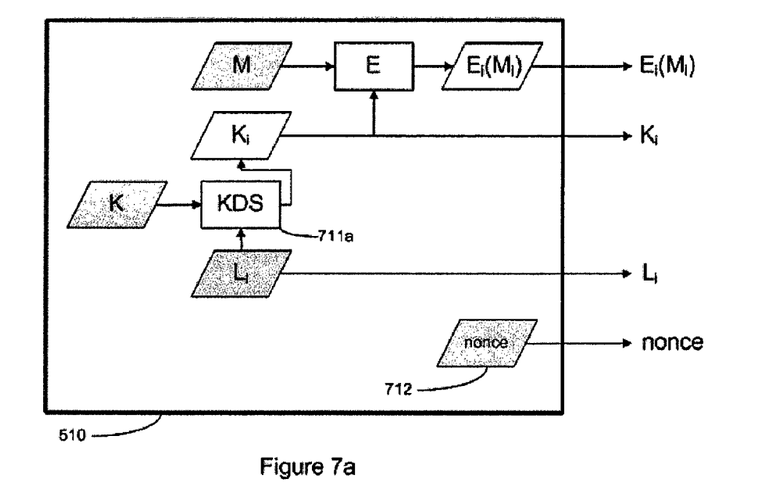
FIG. 7a schematically depicts data and processes of the primary verification system, FIG. 7b schematically depicts data and processes of a particular secondary verification system, and FIG. 7c schematically depicts data and processes of the chip of FIG. 2.
Figure 7B:
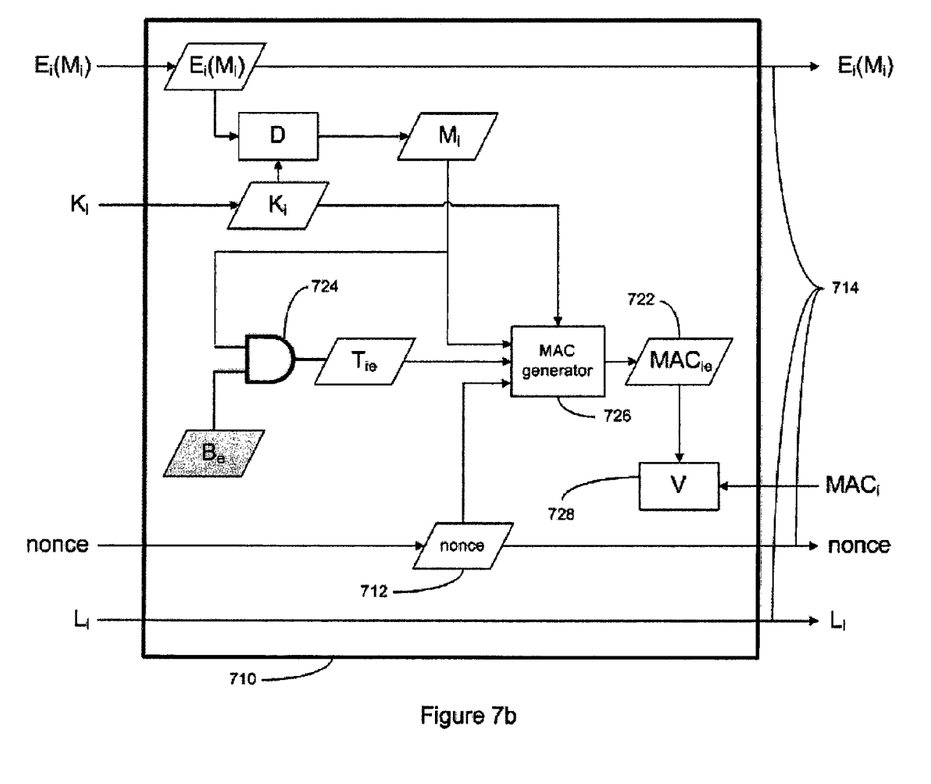
Figure 7C:
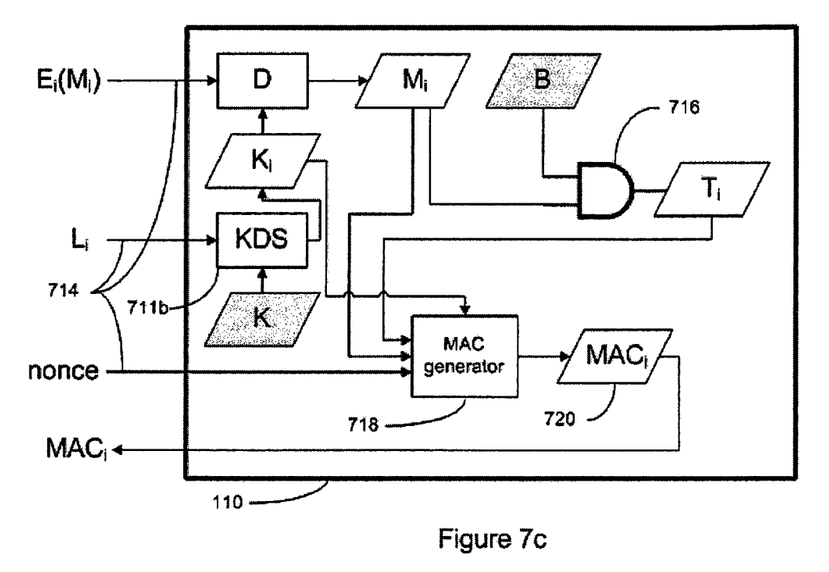

FIGS. 7a, 7b and 7c schematically depict a verification procedure in one exemplary embodiment. FIG. 7a schematically depicts data and processes of the primary verification system 510, FIG. 7b schematically depicts data and processes of a particular secondary verification system 710, and FIG. 7c schematically depicts data and processes of the chip 110.

As described above, the chip 110 has stored thereon the symmetric secret key K, and the bit array B containing configuration data.

The primary verification system 510 has access to the symmetric secret key K of the chip 110. The primary verification system 510 assigns an ID label $L_i$ to the secondary verification system 710. Furthermore, the primary verification system 510 assigns a bit mask $M_i$ to the secondary verification system 710 based on which portion $F_i$ of the configuration data the secondary verification system 710 is interested in. Using a robust Key Derivation Scheme (KDS) 711a, the primary verification system 510 creates a unique key $K_i$ for the secondary verification system 710 based on the symmetric secret key K of the chip 110 and the ID label $L_i$ of the secondary verification system 710. In other words, $K_i = f(K, L_i)$. To ensure the security of the symmetric secret key K, it is computationally infeasible to derive K from $K_i$ and $L_i$. Many such Key Derivation Schemes are available in the prior art. The primary verification system 510 is further operable to provide a random value or nonce 712.

Using an encryption module E, the primary verification system 510 encrypts the bit mask $M_i$ using the unique key $K_i$ to provide an encrypted bit mask $E_i(M_i)$. The primary verification system 510 sends the encrypted bit mask $E_i(M_i)$, the unique key $K_i$, the ID label $L_i$, and the nonce 712 to the secondary verification system 710, preferably via a secure channel.

Referring to step S601, the secondary verification system 710 receives the encrypted bit mask $E_i(M_i)$ from the primary verification system 510. Referring to step S602, the secondary verification system 710 also receives the ID label $L_i$ from the primary verification system 510. Furthermore, referring to step S603, the secondary verification system 710 receives the unique key $K_i$ from the primary verification system 510. The nonce 512 is also received. The secondary verification system 710 itself has access to the expected values of B, namely $B_e$. If any specific ones of the expected values of B are not known to the secondary verification system 710, this is because the secondary verification system 710 has no interest in these bits (i.e. these unknown bits are not at positions $F_i$ in the bit array B). Any unknown expected values may be set to 0 or 1 since their values will be irrelevant once the mask $M_i$ has been applied.

Referring to step S604, the secondary verification system 710 sends a verification request 714 to the chip 110. The verification request 714 includes the encrypted bit mask $E_i(M_i)$, the ID label $L_i$ and the nonce 712. The verification request 714 may be submitted directly or indirectly via a secure or unsecure channel.

Referring to step S301, the verification request 714 is then received by the chip 110. The chip 110 has access to the same KDS 711b as the primary verification system 510. Thus, the chip 110 is able to internally calculate the unique key $K_i$ based on the symmetric secret key K of the chip 110 and the received ID label $L_i$. Using a decryption module D, the chip 110 then internally decrypts the received encrypted bit mask $E_i(M_i)$ using the calculated unique key $K_i$. Thus, the chip 110 gains knowledge of the relevant bit mask $M_i$. The chip 110 then applies the bit mask $M_i$ to the bit array B to internally compute a bit array $T_i$, where $T_i = B \wedge M_i$. This computation is schematically depicted by the AND gate 716 in FIG. 7c. This computation acts to set $T_{ij}=0$ if $j \notin F_i$, and to set $T_{ij}=1$ if $j \in F_i$. Thus, all irrelevant bits of B are again disregarded.

Referring to step S302, the chip 110 then generates verification data. In this embodiment, a Message Authentication Code (MAC) is again the mechanism for establishing authenticity. However, it will be appreciated that other mechanisms could alternatively be used. As shown in FIG. 7c, the bit mask $M_i$, the bit array $T_i$, and the received nonce 712 are all input into a MAC generator 718 which is keyed with the unique key $K_i$ calculated by the chip 110. The MAC generator 718 outputs a MAC value ($MAC_i$) 720, where $MAC_i = MAC(\text{nonce} \| M_i \| T_i)$. In other words the MAC value ($MAC_i$) 720 is a keyed hash of the nonce concatenated with the bit mask $M_i$ and the array $T_i$. The MAC value ($MAC_i$) 720 is then sent to the secondary verification system 710. Thus, in this embodiment, the verification data is the MAC value ($MAC_i$) 720.

The secondary verification system 710 independently calculates an expected MAC value ($MAC_{ie}$) 722. In particular, the secondary verification system 710 applies the bit mask $M_i$ to the expected bit array $B_e$ to compute a bit array $T_{ie}$, where $T_{ie} = B_e \wedge M_i$. This computation is schematically depicted by the AND gate 724 in FIG. 7b. Thus, all irrelevant bits of $B_e$ are disregarded and, as mentioned above, the values of these irrelevant bits have no impact on the verification procedure. As shown in FIG. 7b, the bit mask $M_i$, the bit array $T_{ie}$, and the nonce 712 are all input into a MAC generator 726 which is keyed with the unique key $K_i$. The MAC generator 726 outputs a MAC value ($MAC_{ie}$) 722, where $MAC_{ie} = MAC(\text{nonce} \| M_i \| T_{ie})$. In other words, the expected MAC value ($MAC_{ie}$) 722 is a keyed hash of the nonce concatenated with the bit mask $M_i$ and the bit array $T_{ie}$.

Having received the MAC value ($MAC_i$) 720 in step S605, and having calculated the expected MAC value ($MAC_{ie}$) 722, the secondary verification system 710 is able to compare the received and expected MAC values ($MAC_i$ 720 and $MAC_{ie}$ 722) using a verification module 728. This forms part of step S606. If the $MAC_i$ 720 and $MAC_{ie}$ 722 values match, then the configuration data in the OTP memory 14 of the chip 110 is as expected for the bits of interest (i.e. the $K_i$ bits at position $F_i$ in the S-bit array B). If the $MAC_i$ 720 and $MAC_{ie}$ 722 values do not match, this is indicative of a manufacturing problem for the chip 110. An output of the verification module 728 may be provided to a user.

Thus, it is possible to detect misconfigurations and any tampering with the results. The scheme described above allows the secondary verification system 710 to confirm that the SoC is configured as expected in the pertinent areas of the OTP memory 14, even if the data was collected in an unsecure environment. Also, the scheme allows the primary verification system 510 to provide different bit masks $M_i$, ID labels $L_i$ and unique keys $K_i$ to different secondary verification systems 710. This scheme further ensures that a secondary verification system 710a cannot modify a check performed by another secondary verification system 710b.

Applications Examples

It is envisaged that the chip 110 could be included in a Set Top Box (STB) that includes a secured microprocessor on the SoC. In particular, the verification functionality is useful for software-only Conditional Access (CA) client implementation where no smart card is available at the consumer appliance. The verification functionality allows a manufacturer to ensure that the chip's security functions are correctly activated, such that the CA client cannot be compromised by third party attacks.

Another application of the chip 110 concerns a potential service to support companies generating licensing revenues from activated IP cores on such a chip. The chip 110 and associated verification methodologies would enable implementation of an accounting mechanism to support a per chip royalty since it would be possible to verify how many chips 110 include the relevant IP core.

FINAL REMARKS

Although preferred embodiments of the invention have been described, it is to be understood that these are by way of example only and that various modifications may be contemplated.

For example, it will be appreciated that the boundaries between logic blocks are merely illustrative and that alternative embodiments may merge logic blocks or elements, or may impose an alternate decomposition of functionality upon various logic blocks or elements.

It will further be appreciated that some of the above-mentioned functionality and modules may be implemented as hardware and/or software. For example, the functional modules of the primary and/or secondary verification systems may be implemented as one or more software components for execution by a processor of the system. Alternatively, the above-mentioned modules may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A chip comprising:
   a plurality of functional modules operable to be selectively enabled or disabled;
   a one-time programmable (OTP) memory storing chip configuration data relating to the selective enablement or disablement of each of the plurality of functional modules; and
   a verification module operable to access the OTP memory;
   wherein the verification module is operable to receive a verification request relating to a specified portion of the OTP memory, the specified portion of the OTP memory relating to specific memory location of the OTP memory corresponding to particular ones of the plurality of functional modules that are of interest to a requesting party, the verification request comprising mask data defining the specified portion of the OTP memory; and
   wherein, in response to the verification request, the verification module is operable to use the mask data and the OTP memory to generate verification data relating to the specified portion of the OTP memory, the verification data further being generated based on a secret key of the chip.

2. The chip of claim 1 wherein the OTP memory comprises a hit array (B) and the mask data comprises a bit mask (M) defining a specified portion of the bit array.

3. The chip of claim 1 wherein the verification request further comprises a nonce, and the verification data is further generated based on the nonce.

4. The chip of claim 1 wherein the verification module is operable to generate the verification data using a keyed cryptographic hash function.

5. The chip of claim 1 wherein the secret key is a private key of the chip.

6. The chip of claim 1 wherein the secret key is a symmetric secret key shared by the chip and a primary verification system.

7. The chip of claim 6 wherein the verification request further comprises ID data associated with a party submitting the verification request to the chip, and the verification data is further generated based on the ID data.

8. A chip-implemented method of generating verification data relating to a specified portion of a one-time programmable (OTP) memory of the chip, the chip comprising a plurality of functional modules operable to be selectively enabled or disabled, the OTP memory storing, chip configuration data relating to the selective enablement or disablement of each of the plurality of functional modules, and the specified portion of the OTP memory relating to specific memory locations of the OTP memory corresponding to particular ones of the plurality of functional modules that are of interest to a requesting party, the method comprising:
   receiving a verification request relating, to the specified portion of the OTP memory, wherein the verification request comprises mask data defining the specified portion of the OTP memory; and
   in response to the verification request, using the mask data and the OTP memory to generate verification data relating to the specified portion of the OTP memory, wherein the verification data is further generated based on a secret key of the chip.

9. A method for a primary verification system to verify a configuration of a specified portion of a one-tame programmable (OTP) memory of a chip, an expected configuration of the specified portion of the OTP memory of the chip being known to the primary verification system, a verification key associated with the secret key of the chip also being known to the primary verification system, the chip comprising a plurality of functional modules operable to be selectively enabled or disabled, the OTP memory of the chip storing chip configuration data relating to the selective enablement or disablement of each of the plurality of functional modules, and the specified portion of the OTP memory relating to specific memory locations of the OTP memory corresponding to particular ones of the plurality of functional modules that are of interest to a requesting party, the method comprising:

sending, to the chip, a verification request relating to the specified portion of the OTP memory wherein the verification request comprises mask data defining the specified portion of the OTP memory, receiving, from the chip, verification data relating to the specified portion of the OTP memory, wherein the verification data is generated by the chip based on the OTP memory, the received mask data and the secret key; and verifying the received verification data using the expected configuration of the chip, the mask data and the verification key so as to determine whether the configuration of the specified portion of the OTP memory of the chip is as expected.

10. The method of claim 9 wherein the secret key is a private key of the chip and the verification key is a public key of the chip.

11. The method of claim 9 wherein the verification key is the same as the secret key, the secret key being a symmetric secret key shared by the chip and the primary verification system.

12. A method for a secondary verification system to verify a configuration a specified portion of a onetime programmable (OTP) memory of a chip, an expected configuration of the specified portion of the OTP memory of the chip being, known to the secondary verification system, the chip comprising a plurality of functional modules operable to be selectively enabled or disabled, the OTP memory of the chip storing chip configuration data relating to the selective enablement or disablement of each of the plurality of functional modules, and the specified portion of the (YIP memory relating to specific memory locations of the OTP memory corresponding to particular ones of the plurality of functional modules that are of interest to a requesting party, there being a symmetric secret key shared by the chip and a primary verification system, the method comprising:

receiving, from the primary verification system, mask data defining a specified portion of the OTP memory;

receiving, from the primary verification system, ID data associated with the secondary verification system;

receiving, from the primary verification system, a secondary key, wherein the secondary key is derived by the primary verification system from the ID data and the symmetric secret key using a key derivation scheme;

sending, to the chip, a verification request relating to the specified portion of the OTP memory, wherein the verification request comprises the mask data and the ID data;

receiving, from the chip, verification data relating to the specified portion of the OTP memory, wherein the verification data is generated by the chip based on the OTP memory, the received mask data and the secondary key, wherein the secondary key is derived by the chip from the received ID data and the symmetric secret key using the key derivation scheme; and verifying the received verification data using the expected configuration of the chip, the mask data and the secondary key so as to determine whether the configuration of the specified portion of the OTP memory of the chip is as expected.

13. A set top box comprising:

a chip including:
  a plurality of functional modules operable to be selectively enabled or disabled;
  a one-time programmable (OTP) memory storing chip configuration data relating to the selective enablement or disablement of each of the plurality of functional modules; and
  a verification module operable to access the OTP memory;

wherein the verification module is operable to receive a verification request relating to a specified portion of the OTP memory, the specified portion of the OTP memory relating to specific memory location of the OTP memory corresponding to particular ones of the plurality of functional modules that are of interest to a requesting party, the verification request comprising mask data defining the specified portion of the OTP memory; and wherein, in response to the verification request, the verification module is operable to use the mask data and the OTP memory to generate verification data relating to the specified portion of the OTP memory, the verification data further being generated based on a secret key of the chip.

14. Non-transient computer readable media having instructions recorded thereon which, when executed by one or more processors of a primary verification system, cause the one or more processors to carry out a verification on a configuration of a specified portion of a one-time programmable (OTP) memory of a chip, an expected configuration of the specified portion of the OTP memory of the chip being known to the primary verification system, a verification key associated with the secret key of the chip also being known to the primary verification system, the chip comprising a plurality of functional modules operable to be selectively enabled or disabled, the OTP memory of the chip storing chip configuration data relating to the selective enablement or disablement of each of the plurality of functional modules, and the specified portion of the (YIP memory relating to specific, memory locations of the OTP memory corresponding to particular ones of the plurality of functional modules that are of interest to a requesting party, the verification comprising:

sending, to the chip, a verification request relating to the specified portion of the OTP memory, wherein the verification request comprises mask data defining the specified portion of the OTP memory;

receiving, from the chip, verification data relating to the specified portion of the OTP memory, wherein the verification data is generated by the chip based on the OTP memory, the received mask data and the secret key; and verifying the received verification data using the expected configuration of the chip, the mask data and the verification key so as to determine whether the configuration of the specified portion of the OTP memory of the chip is as expected.

15. Non-transient computer readable media having instructions recorded thereon which, when executed by one or more processors of a secondary verification system, cause the one or more processors to carry out a verification of a configuration a specified portion of a one-time programmable (OTP) memory of a chip, an expected configuration of the specified portion of the OTP memory of the chip being known to the secondary verification system, the chip comprising a plurality of functional modules operable to be selectively enabled or disabled, the OTP memory of the chip storing chip configuration data relating to the selective enablement or disablement of each of the plurality of functional modules, and the specified portion of the OTP memory relating to specific memory locations of the OTP memory corresponding to particular ones of the plurality of functional modules that are of interest to a requesting party, there being a symmetric secret key shared by the chip and a primary verification system, the verification comprising:

receiving, from the primary verification system, mask data defining a specified portion of the OTP memory;

receiving, from the primary verification system ID data associated with the secondary verification system;

receiving, from the primary verification system, a secondary key, wherein the secondary key is derived by the primary verification system from the ID data and the symmetric secret key using a key derivation scheme;

sending, to the chip, a verification request relating to the specified portion of the OTP memory, wherein the verification request comprises the mask data and the ID data;

receiving, from the chip, verification data relating to the specified portion of the OTP memory, wherein the verification data is generated by the chip based on the cap memory, the received mask data and the secondary key, wherein the secondary key is derived by the chip from the received ID data and the symmetric secret key using the key derivation scheme; and verifying the received verification data using the expected configuration of the chip, the mask data and the secondary key so as to determine whether the configuration of the specified portion of the OTP memory of the chip is as expected.

* * * * *